May 25, 1943. E. S. GOODRIDGE Re. 22,322

INDUCTION HEATING DEVICE

Original Filed April 19, 1941

INVENTOR
EDWARD S. GOODRIDGE
BY John J. Logan
ATTORNEY

Reissued May 25, 1943

Re. 22,322

UNITED STATES PATENT OFFICE 22,322

INDUCTION HEATING DEVICE

Edward S. Goodridge, Port Washington, N. Y., assignor to Induction Heating Corporation, New York, N. Y., a corporation of New York Original No. 2,308,240, dated January 12, 1943, Serial No. 389,296, April 19, 1941. Application for reissue March 11, 1943, Serial No. 478,767

10 Claims. (Cl. 219—47)

This invention relates to heating arrangements and more particularly to furnaces of the high frequency induction type.

A principal object is to provide an improved induction furnace of the conveyor type.

Another object is to provide an improved construction and shape of field coil for induction furnaces generally.

Another feature relates to an induction furnace having a conveyor or movable platform for carrying a series of articles through a magnetic induction field, the field being produced by a novel form of field coil whereby the articles can enter and exit from the field without employing a movable coil or flexible connections thereto.

A further feature relates to an improved form of field coil for high frequency induction heaters wherein the end sections of the coil are deflected out of the plane of the coil proper, to produce a predetermined initial and final "soak" or gradation at the beginning and ending of the heat treatment.

A further feature relates to a conveyor furnace of the high frequency induction type wherein the articles are in a direction at an angle to the axis of the coil convolutions while allowing the articles to be surrounded by the field within the convolutions without the necessity of employing a movable coil.

A still further feature relates to the novel organization, arrangement and relative disposition of parts which constitute an improved induction conveyor type furnace and an improved field coil therefor.

Other features and advantages not specifically enumerated will be apparent after a consideration of the following details descriptions and the appended claims.

While the drawing is concerned primarily with the field coil in conjunction with the conveyor of a progressive heat treating furnace, only those parts are shown in detail which are necessary to an understanding of the invention. Furthermore, while the drawing illustrates one particular shape of elongated field coil, it will be understood that the shape may be varied to suit the configuration of the articles to be treated and to suit the distribution of the magnetic flux desired at various points during the progress of the article through the coil. Accordingly, in the drawing which represents one of many forms which the invention may assume, Fig. 1 is a top plan view of the field coil and conveyor unit embodying features of the invention.

High frequency induction furnaces may be roughly grouped into two categories, those wherein the article or charge moves along a line which is substantially parallel to the axis of the convolutions of the field coil, and those wherein the article or charge moves at an angle to the axis of the field coil. The first type is open to the objection that the conveyor as well as the charge must pass through the field coil, and if the conveyor or other support contains any conductive parts which are susceptible to the magnetic flux, this reduces the heating efficiency while unnecessarily heating such parts. The second type enables the field coil to be located in inductive relation to the charge while exerting negligible heating effect on the conveyor support. However, since in this second type of furnace the charge must be surrounded by the convolutions of the field coil, it is necessary to provide means to raise and lower the coil in order to make sure that the turns thereof enclose or surround the charge. Heretofore, this has necessitated mechanical arrangements for raising and lowering the coil and also the presence of flexible connections between the high frequency source of supply and the ends of the coil. These mechanical connections are a source of difficulty and the flexible connections also tend to deteriorate and eventually break, particularly where the coil must be moved to any considerable distance. In accordance with this invention, it is possible to heat-treat articles by surrounding them with the inductive field while maintaining the coil stationary.

Figure 1:
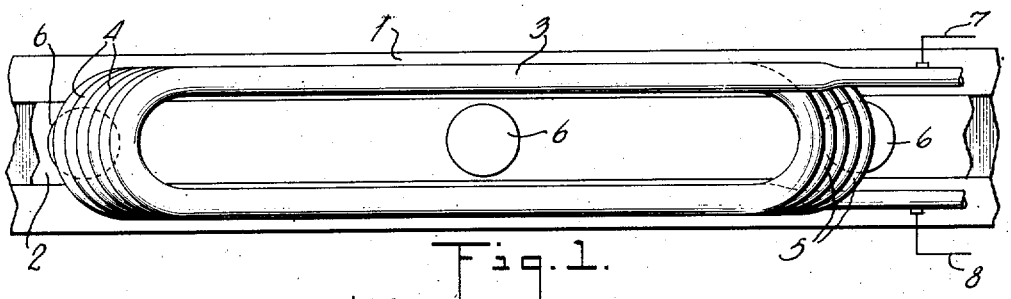

Referring to Fig. 1, there is shown a suitable support or track 1 preferably of non-magnetic material or material which is not appreciably affected by the high frequency heating field. Supported on the track 1 in any convenient manner, is a platform or belt 2, which is adapted to be moved in the direction of the arrow either in a step-by-step or in a continuous manner by any suitable motive source. It will be understood of course that the platform 2 may take the form of any well-known type of belt or endless conveyor.

The articles to be treated are placed upon the platform 2 so as to be carried thereby through the high frequency field. This field is produced by a convoluted coil the main body section 3 of which is substantially elongated and the end sections 4 and 5 of which are bent out of the plane of the body section 3 as shown more clearly in Figs. 2 and 3. By thus bending the end sections of each convolution, it is possible to allow the article or charge 6 to be moved in the direction of the arrow and the inclined character of the end sections enables the charge to enter the coil so that throughout the entire length of the body section 3, it is completely surrounded by the field of one or more complete turns of the coil. If the end sections of the coil were in the same plane as the body section 3, it would be necessary to raise the coil in order to allow the article 6 to enter the field, and thereafter it would be necessary to lower the coil so as to bring the convolutions in the proper coupling with respect to the charge 6. Likewise, at the exit end of the coil, the end turns 5 are bent upwardly at a sufficient angle to enable the article or charge 6 to emerge from the field without changing the position of the coil. Preferably, the coil is made from metal tubing such as copper or the like which is adapted to be connected to a source of cooling medium such as cool air or water which can continually circulate through the coil as is well-known in the art. It will be understood of course that the terminals of the coil are connected by conductors 7 and 8 to any suitable source of high frequency current.

Figure 2:
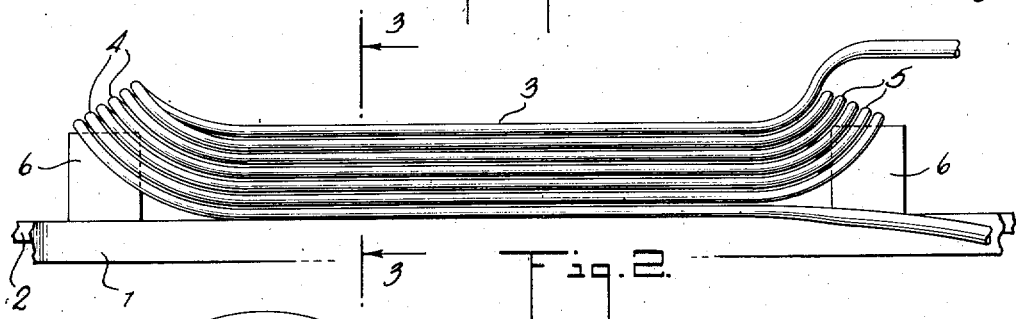
Fig. 2 is a front elevational view of Fig. 1.

The deflected ends of the coil convolutions in addition to enabling the charge to enter and leave the field while maintaining the coil stationary, also have the advantage that a graduated heating effect is produced at both the entrance and exit ends of the device. Thus as shown in Fig. 2 at the entrance end, the coupling between the charge 6 and the field of the coil is much less than the coupling existing therebetween when the charge is within the body section 3 and enveloped thereby. By proportioning the off-setting or inclination of the end sections, it is possible therefore to graduate the heating effect between any desired limits prior to subjecting the charge 6 to the maximum heating effect of the main or body section 3. Likewise, at the exit end by providing a predetermined offset to the end sections 5, it is possible to graduate the reduction in the heating effect as the charge leaves the coil. It will be understood of course that the individual poles or convolutions of the coil are spaced apart from each other so as to prevent short-circuiting therebetween.

Figure 3:
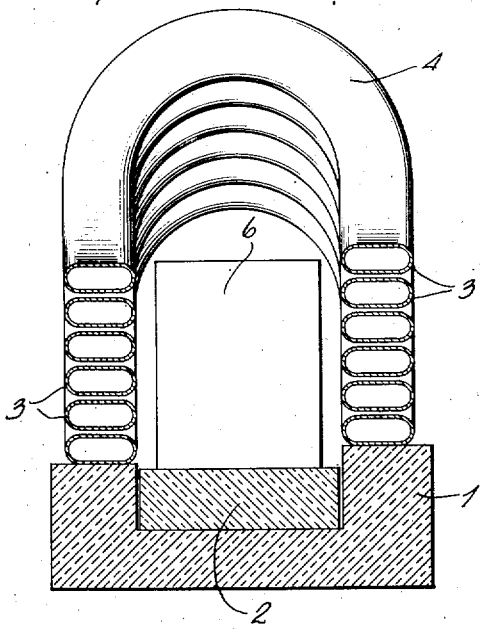
Fig. 3 is a sectional view of Fig. 2, taken along the line 3—3 thereof and viewed in the direction of the arrows.
Figure 4:
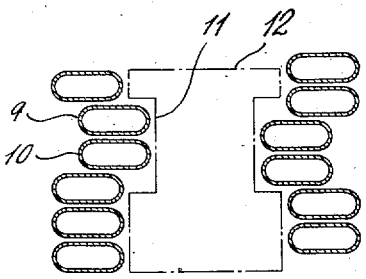
Fig. 4 shows a modification of Figs. 1–3.

While Figs. 1 to 3 show a field coil wherein all the convolutions are in the same vertical plane, it will be understood that one or more of the convolutions may be offset inwardly or outwardly with respect to the remaining convolutions so as to form to the general shape of particular articles to be heat-treated. Thus, as shown schematically in Fig. 4, the coil is shown in section with six separate convolutions, it being understood of course that the ends of each convolution are offset or bent upwardly in the manner illustrated in Figs. 2 and 3. However, in this embodiment, the convolutions 9 and 10 are offset inwardly with respect to the remaining convolutions so as to be in approximately the same coupling ratio with respect to the reduced or neck section 11 of the charge 12 as the coupling which exists between the remaining convolutions and the corresponding larger portions of the said charge. From the foregoing, it will be clear therefore, that the cross-sectional configuration of the coil throughout the main or body portion 2, may be given any desired shape in conformity with the shape of the article being treated. It will be understood of course, that while Figs. 1 and 2 show the coil disposed so that the axis of the convolutions is vertical, the coil may be located so that the said axis is horizontal or in any other angular position providing the end sections of each convolution are offset sufficiently to enable the charge or any projecting portion thereof to enter the coil while the latter is stationary.

Figure 5:
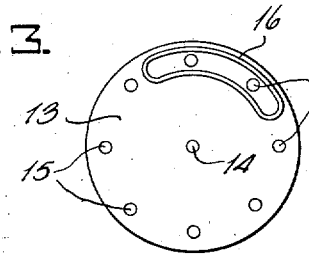
Fig. 5 shows another modification of Figs. 1–3.

Instead of employing a longitudinal conveyor and a straight-sided field coil, it will be understood that the invention can also be applied to rotating platform conveyors in which event the field coil instead of being straight-sided will be arcuate in shape. Such an arrangement is shown in Fig. 5 which represents a top-plan view of a platform 13 the shaft 14 of which is rotated by any suitable means, and this platform carries at spaced intervals around its periphery a series of articles 15 to be subjected to the high frequency field. The field coil 16 is elongated and is similar to the coil of Fig. 1 with the exception that the main or body section of the convolutions is arcuate to correspond with the circumferential path travelled by the articles 15 as the platform rotates. In this embodiment of course, the ends of the coil 16 are offset vertically to enable the articles to enter and leave the field coil while the latter is stationary.

While certain specific embodiments have been disclosed and described herein, it will be understood that various changes and modifications may be made without departing from the spirit and scope of the invention. For example, while the coil has been illustrated with both ends inclined or offset with respect to the main body section, it will be understood that certain advantages of the invention may be obtained where only one end of the coil is offset. Thus the entrance end of the coil may be offset and the rest of the coil may be substantially flat in which event the articles may be dropped off the conveyor before they engage the non-offset end of the coil. Likewise, while the drawing shows the coil provided with the ends inclined at one particular angle, it will be understood that this inclination may be any angle desired consistent with the desired graduated heating effect and with the necessary clearance at the entrance or exit ends as above described.

What I claim is:

1. A unitary field coil for induction heating comprising a conductor shaped to form at least one substantially complete convolution to receive and inductively surround an article to be heated while the article is passing through the field within the coil, the end sections of the convolution being bent out of the plane of the convolution so as to enable the article to enter and leave the coil at opposite ends of the convolution, by a uni-directional motion with the coil stationary and while the article during such motion passes along between the sides of the convolution, said sides extending substantially directly between said end sections and along opposite sides of a path for the article therebetween.

2. A field coil for induction heating comprising at least one complete convolution having only the end sections bent at an angle to provide a graduated induction effect at said end sections on a charge moving at an angle to the convolution axis, and to provide at opposite ends a clear entrance and exit for the charge while the coil is maintained stationary.

3. A field coil for induction heating comprising a plurality of superposed helically wound convolutions having an elongated main body section terminating in end sections, said end sections being inclined with respect to the main section to permit the charge moving at an angle to the axis of the convolutions to enter the coil freely at one end, and to exit freely from the coil at the opposite end after passing between the side portions of said convolutions, without moving the coil, said end sections respectively being arched around the entering and exit paths.

4. A field coil for induction heating devices comprising a plurality of superposed helically wound elongated convolutions, the turns of the convolutions at one end being inclined with respect to the main body portion thereof and one or more turns of the main body section being offset inwardly to conform to the contour of an article to be passed through said coil for heating.

5. An induction heating device comprising a platform for supporting articles to be heated, an induction field coil having at least one convolution with its magnetic axis extending toward the platform, said coil being stationary with respect to said platform, said platform being arranged to carry said articles in succession through the space between the side portions of the turn or turns of said coil to be enveloped by the field thereof, the end sections of said coil being offset to extend away from said platform to provide at one end of the coil a clear entrance path for the entrance of the articles into the coil and at the opposite end a clear exit path for the articles, while the coil is stationary, and the sides of the coil extending longitudinally of the path for the article with substantially uniform spaced relation to such path.

6. A field coil for induction heating comprising a conductor having parallel elongated sides and inclined ends, said sides and ends constituting at least one continuous inductive loop, the said inclined ends providing for the article clear entrance and exit paths respectively at opposite ends of the coil while the coil is maintained stationary.

7. A unitary field coil for induction heating comprising a helically wound coil with the convolutions elongated in the direction of movement of a charge through the field thereof, the end sections being tilted to provide entrance and exit openings for the charge, said end sections respectively being arched around the entering and exit paths.

8. In induction heating apparatus, means for supporting a series of articles to be heated, a pair of elongated conductor portions adapted to carry high frequency current and so arranged in generally parallel spaced relation that such series of articles is enveloped by the field therebetween with close inductive relation between the articles and conductors, and other conductor portions at the ends of said first named portions and connected for substantially completing therewith an elongated convolution for forming a part of a high frequency circuit, said second named conductor portions at both ends of the convolution being arched away from such close inductive relation to the articles at the ends of the convolution, to thereby somewhat reduce the effective strength of the field otherwise applicable to the articles at said ends.

9. In induction heating apparatus, means for supporting and conveying in succession along a predetermined path a series of articles to be heated, one or more pairs of elongated conductor portions adapted to carry high frequency current and so arranged in generally parallel spaced relation that the series of articles is conveyed along therebetween in close inductive relation therewith, and other conductor portions at the ends of said first named portions and connected for substantially completing therewith one or more elongated loops for forming a part of a high frequency circuit, said second named conductor portions extending from one side of said path generally transversely thereof around outside the path to the other side thereof while leaving the path unobstructed.

10. In induction heating apparatus, means for supporting and conveying in succession along a predetermined substantially arcuate path a series of articles to be heated, one or more pairs of elongated correspondingly arcuate conductor portions adapted to carry high frequency current and so arranged in generally parallel spaced relation that the series of articles is conveyed along therebetween in close inductive relation therewith, and other conductor portions at the ends of said first named portions and connected for substantially completing therewith one or more elongated loops for forming a part of a high frequency circuit, said second named conductor portions extending from one side of said path generally transversely thereof around outside the path to the other side thereof while leaving the path unobstructed.

EDWARD S. GOODRIDGE.